US011241915B2

(12) United States Patent
    Yasunaga (10) Patent No.: US 11,241,915 B2
(45) Date of Patent: Feb. 8, 2022

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 373 days.

(21) Appl. No.: 16/210,295

(22) Filed: Dec. 5, 2018

(65) Prior Publication Data

US 2019/0176524 A1 Jun. 13, 2019

(30) Foreign Application Priority Data

Dec. 13, 2017 (JP) .............................. JP2017-238875

(51) Int. Cl.
 *B60C 11/01* (2006.01)
 *B60C 11/03* (2006.01)
 *B60C 11/12* (2006.01)

(52) U.S. Cl.
 CPC .......... *B60C 11/01* (2013.01); *B60C 11/0302* (2013.01); *B60C 11/032* (2013.01); *B60C 11/0306* (2013.01); *B60C 11/0309* (2013.01); *B60C 11/1204* (2013.01); *B60C 2011/013* (2013.01); *B60C 2011/0346* (2013.01); *B60C 2011/0358* (2013.01); *B60C 2011/1213* (2013.01); *B60C 2011/1227* (2013.01)

(58) Field of Classification Search
 CPC ................. B60C 11/01; B60C 11/0302; B60C 2011/013; B60C 2011/0358
 See application file for complete search history.

(56) References Cited

U.S. PATENT DOCUMENTS

| 2002/0026972 A1* | 3/2002 | Ochi | ....................... B60C 11/13 152/209.28 |
| 2011/0277895 A1 | 11/2011 | Takahashi | |
| 2013/0306208 A1 | 11/2013 | Kageyama | |
| 2015/0059942 A1 | 3/2015 | Takei | |
| 2017/0305201 A1 | 10/2017 | Akashi | |

(Continued)

FOREIGN PATENT DOCUMENTS

| CN | 104245360 A | 12/2014 |
| CN | 107107669 A | 8/2017 |

(Continued)

OTHER PUBLICATIONS

Machine translation for Japan 2017-213925 (Year: 2020).*

(Continued)

*Primary Examiner* — Steven D Maki
(74) *Attorney, Agent, or Firm* — Westerman, Hattori, Daniels & Adrian, LLP (57) ABSTRACT

To provide a pneumatic tire capable of improving rut performance. A pneumatic tire according to an embodiment is a tire having a specified rotation direction. A shoulder region of a tread portion is provided with a shoulder block and a raised portion is provided in an outer extension portion of the shoulder block in a tire width direction in relation to a tire ground contact end. The raised portion includes a corner portion which protrudes from an edge portion of the shoulder block on a front side in the rotation direction toward the front side in the rotation direction.

8 Claims, 5 Drawing Sheets

(56) References Cited

U.S. PATENT DOCUMENTS

| | | | |
|---|---|---|---|
| 2017/0305203 A1 | 10/2017 | Kreitzman et al. | |
| 2018/0022162 A1 | 1/2018 | Takemori | |
| 2018/0043737 A1 | 2/2018 | Akashi | |
| 2019/0061429 A1* | 2/2019 | Yasunaga | B60C 11/1204 |

FOREIGN PATENT DOCUMENTS

| | | | |
|---|---|---|---|
| CN | 107107670 A | | 8/2017 |
| CN | 107107676 A | | 8/2017 |
| JP | 2011-042231 A | * | 3/2011 |
| JP | 2013-216148 A | | 10/2013 |
| JP | 2013-237360 A | | 11/2013 |
| JP | 2017-213925 A | * | 12/2017 |
| WO | 2017/189688 A1 | | 11/2017 |

OTHER PUBLICATIONS

Machine translation for Japan 2011-042231 (Year: 2020).*
Office Action dated Jul. 30, 2020, issued in counterpart CN Application No. 201811388025.8, with English Translation. (10 pages).
Office Action dated Dec. 15, 2020, issued in counterpart DE Application No. 10 2018 221 489.1, with English translation (13 pages).
Office Action dated Feb. 8, 2021, issued in counterpart CN Application No. 201811388025.8, with English Translation. (10 pages).

* cited by examiner

PNEUMATIC TIRE

CROSS-REFERENCE TO RELATED APPLICATIONS

This application is based upon and claims the benefit of priority from the prior Japanese Patent Application No. 2017-238875, filed on Dec. 13, 2017; the entire contents of winch are incorporated herein by reference.

BACKGROUND

1. Technical Field

An embodiment of the present invention relates to a pneumatic tire.

2. Description of the Related Art

For pneumatic tires which are used on icy and snowy roads, it is required to improve running performance inside a rut (a rutted place) in order to ensure performance for allowing the tires to easily escape from the rut, that is, rut performance.

Conventionally, for example, JP-A-2013-216148 proposes a technique in which a surface of a buttress portion at outside of a tread end in a width direction is provided with a raised portion extending from a sidewall portion to the tread end and terminated at a position before reaching the tread end in order to improve traction performance on snow. Further, JP-A-2013-237350 proposes a technique in which a plurality of fin-shaped protrusions are arranged side by side on a buttress portion in order to improve the limit behavior at the time of turning on icy and snowy roads.

SUMMARY

An object of an embodiment of the invention is to provide a pneumatic tire capable of improving rut performance.

A pneumatic tire according to an embodiment of the invention is a pneumatic tire having a specified rotation direction, including: a land portion which is disposed between lateral grooves adjacent to each other in a tire circumferential direction in a shoulder region of a tread portion; and a raised portion which is provided in an extension portion of the land portion located at the outside in a fire width direction in relation to a tire ground contact end, in which the raised portion includes a corner portion which protrudes from an edge portion of the land portion on a front side in the rotation direction toward the front side in the rotation direction.

According to the embodiment, when the raised portion is provided in the extension portion of the land portion provided in the shoulder region and the raised portion is provided with the corner portion which protrudes from the edge portion of the land portion on the front side in the rotation direction, that is, a stepping side edge portion toward the front side in the rotation direction, the corner portion contributes to an improvement in traction property during the forward rotation, thereby improving rut performance.

DETAILED DESCRIPTION

Hereinafter, an embodiment will be described with reference to the drawings.

Although not illustrated in the drawings, a pneumatic tire according to an embodiment includes a pair of right and left bead portions, a pair of right and left sidewall portions, and a tread portion provided between both sidewall portions to connect outer end portions of the right and left sidewall portions in the radial direction and a general tire structure can be used for, a structure other than a tread pattern.

Figure 1:
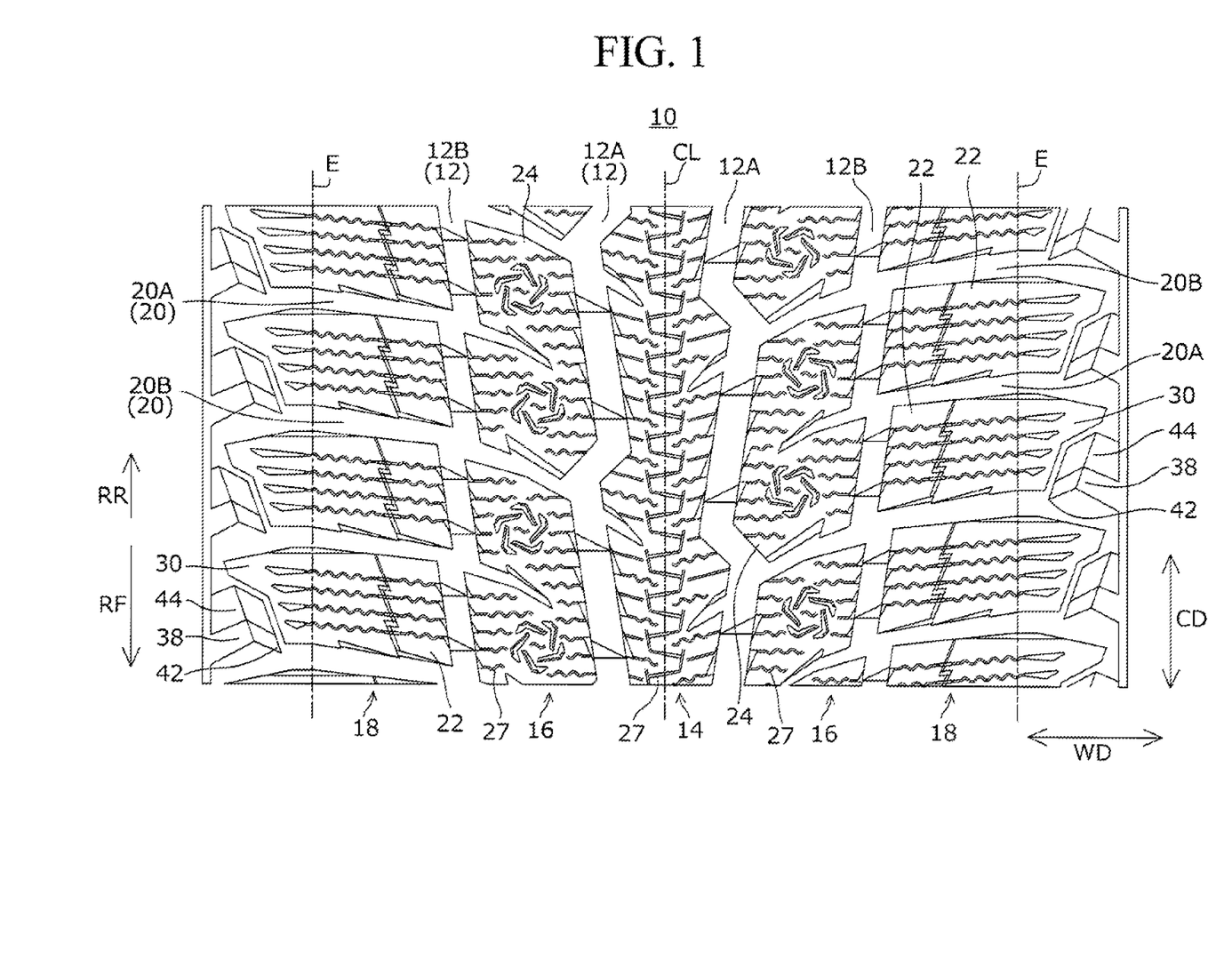
FIG. 1 is a developed view illustrating a tread pattern of a pneumatic tire according to an embodiment.

As illustrated in FIG. 1, a tread rubber surface of a tread portion 10 is provided with a plurality of main grooves 12 which extend in a tire circumferential direction CD and in this example, four main grooves are formed at intervals in a tire width direction WD. That is, a pair of center main grooves 12A and 12A is provided at both sides of a tire equator CL and a pair of shoulder main grooves 12B and 12B is disposed at the outside thereof. Four main grooves 12 are zigzag-shaped grooves which are bent with an amplitude in the tire width direction WD and extend in the tire circumferential direction CD. Furthermore, in FIG. 1, Reference Sign E indicates a tire ground contact end.

The pneumatic tire is a tire having a specified rotation direction and in the drawings, a rotation direction (that is, a front side in a rotation direction) is indicated by Reference Sign RF. The pneumatic tire is attached to a vehicle so that the tire rotates in a direction indicated by an arrow RF when the vehicle runs forward. As a mark for this purpose, a display for designating the rotation direction is provided on, for example, the sidewall portion or the like of the pneumatic tire. In the specification, a rear side in the rotation direction is a direction opposite to the rotation direction RF and is indicated by an arrow RR.

In the tread portion 10, a plurality of land portions are divided by the main groove 12 in the tire width direction WD. Specifically, a center land portion 14 interposed between the pair of center main grooves 12A and 12A, a pair of right and left intermediate land portions 16 and 16 interposed between the center main groove 12A and the shoulder main groove 12B, and a pair of right and left shoulder land portions 18 and 18 located at the outside of the shoulder main groove 12B in the tire width direction are provided.

In the tread portion 10, a plurality of lateral grooves 20 extending in the tire width direction WD are provided at intervals in the tire circumferential direction CD. As the lateral groove 20, a first lateral groove 20A which extends from the inside the intermediate land portion 16 toward the outside in the tire width direction WD while being inclined in a curved shape and opens to the tire ground contact end E and a second lateral groove 20B which extends from the inside of the center land portion 14 toward the outside in the tire width direction WD while being inclined in a curved shape and opens to the tire ground contact end E are provided. The first lateral groove 20A and the second lateral groove 20B are alternately provided in the tire circumferential direction CD.

Accordingly, the center land portion 14 is not divided by the lateral groove 20 and is formed as a rib that extends in the tire circumferential direction CD. Meanwhile, the shoulder land portion 18 is divided by the first lateral groove 20A and the second lateral groove 20B to be formed as a block row in which a plurality of shoulder blocks 22 are arranged in the tire circumferential direction CD. Further, the intermediate land portion 16 is divided by the second lateral groove 20B to be formed as a block row in which the intermediate block 24 is disposed in the tire circumferential direction CD.

The embodiment has a characteristic in the configuration of the shoulder land portion 18 and the configuration of the shoulder land portion 18 will be described in detail below with reference to FIGS. 1 to 6.

Figure 2:
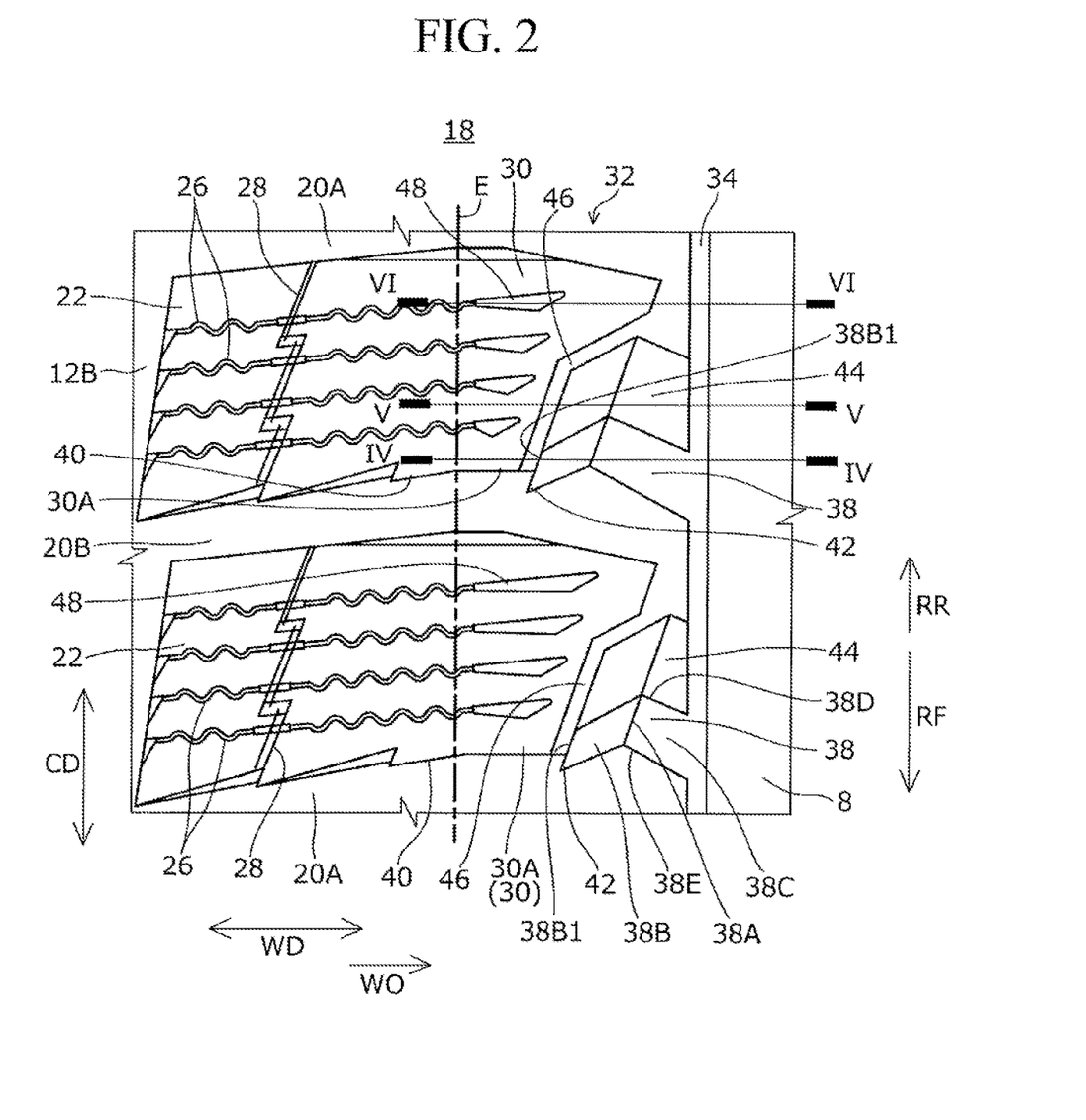
FIG. 2 is an enlarged view of a main part of the tread pattern.

The shoulder block 22 constituting the shoulder land portion 18 is a land portion which is disposed between the lateral grooves 20A and 20B adjacent to each other in the tire circumferential direction CD in the shoulder region of the tread portion 10. The shoulder region is a region on the outside WO in the tire width direction in relation to the shoulder main groove 12B which is the main groove closest to the tire ground contact end E. The shoulder block 22 is divided by the shoulder main groove 12B and the front and rear lateral grooves 20A and 20B and the plurality of shoulder blocks 22 are arranged side by side along the tire ground contact end E. Here, the outside WO in the tire width direction indicates a direction moving away from the tire equator CL in the tire width direction WD.

As illustrated in FIG. 2, the shoulder block 22 is provided with a plurality of sipes 26 which extend in the tire width direction WD at intervals in the tire circumferential direction CD. Further, a sipe 28 which extends in the tire circumferential direction CD is provided to intersect the plurality of sipes 26. Furthermore, as illustrated in FIG. 1, the center land portion 14 and the intermediate land portion 16 are also provided with a plurality of Sipes 27.

Figure 3:
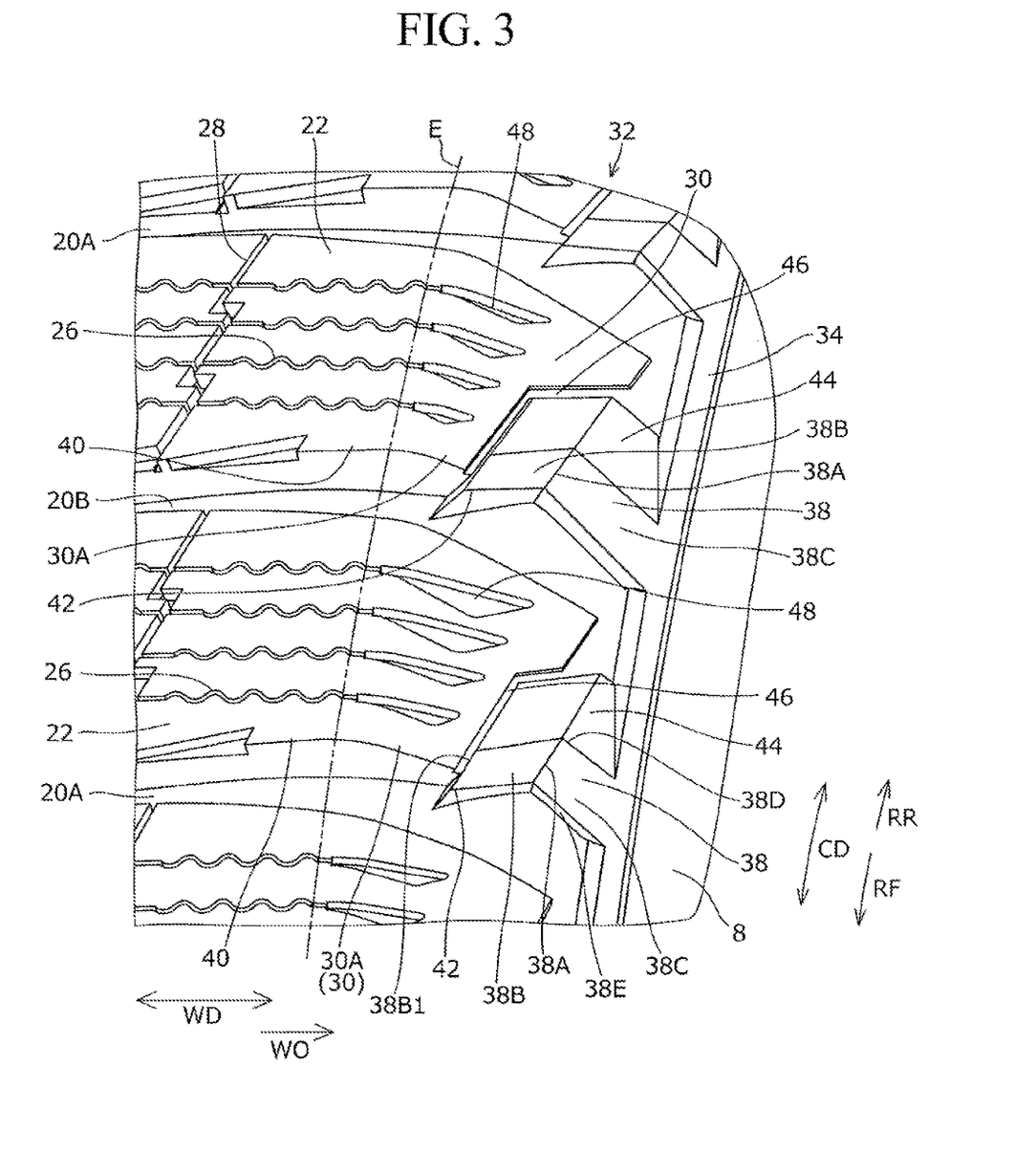
FIG. 3 is an enlarged perspective view in the vicinity of a tire ground contact end of the pneumatic tire.
Figure 6:
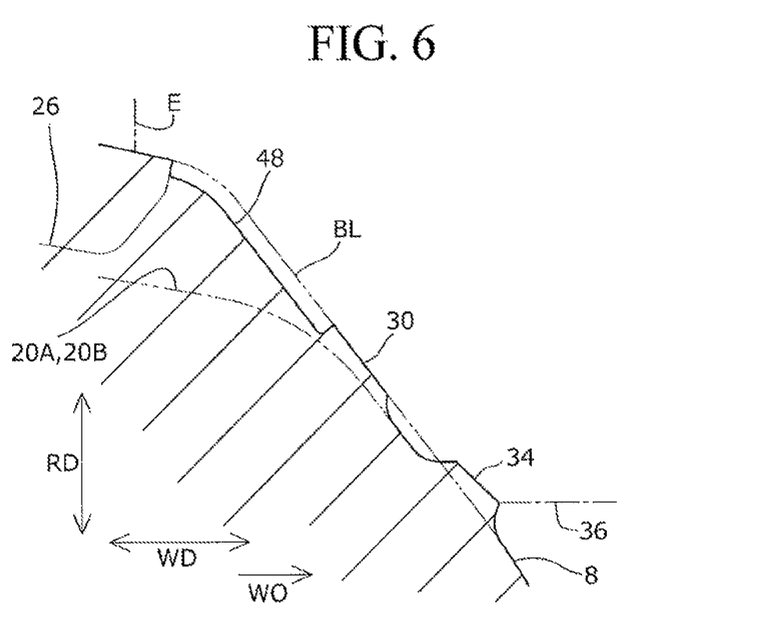
FIG. 6 is a cross-sectional view taken along a line VI-VI of FIG. 2.

The shoulder block 22 includes an extension portion 30 which extends to the outside WO in the tire width direction in relation to the tire ground contact end E. The extension portion 30 is a portion in which the shoulder block 22 protruding with respect to the front and rear lateral grooves 20A and 20B extends in a buttress portion 32 from the tire ground contact end E to the sidewall portion 8 and protrudes with respect to the front and rear lateral grooves 20A and 20B as illustrated in FIG. 3. As illustrated in FIG. 6, the extension portion 30 is formed such that an upper surface (that is, a surface) is inclined inward in a tire radial direction RD so that the raised height from the lateral grooves 20A and 20B gradually decreases toward the outside WO in the tire width direction.

Figure 4:
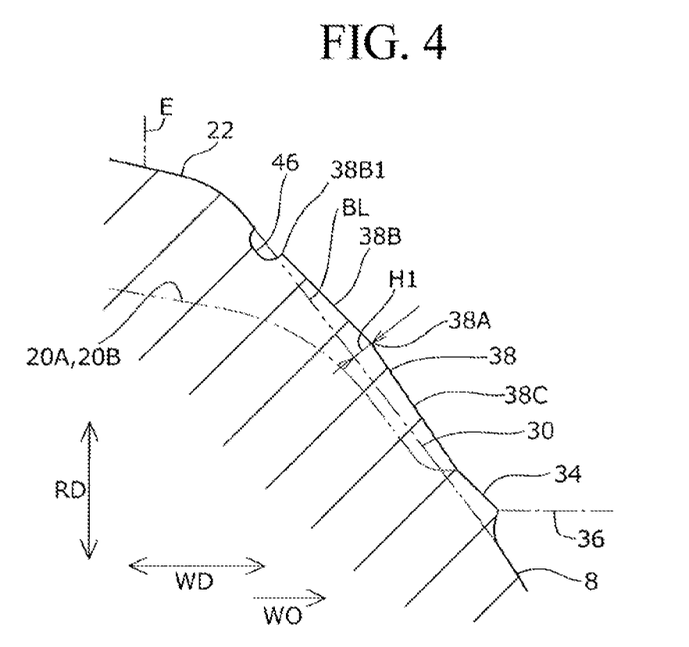
FIG. 4 is a cross-sectional view taken along a line IV-IV of FIG. 2.
Figure 5:
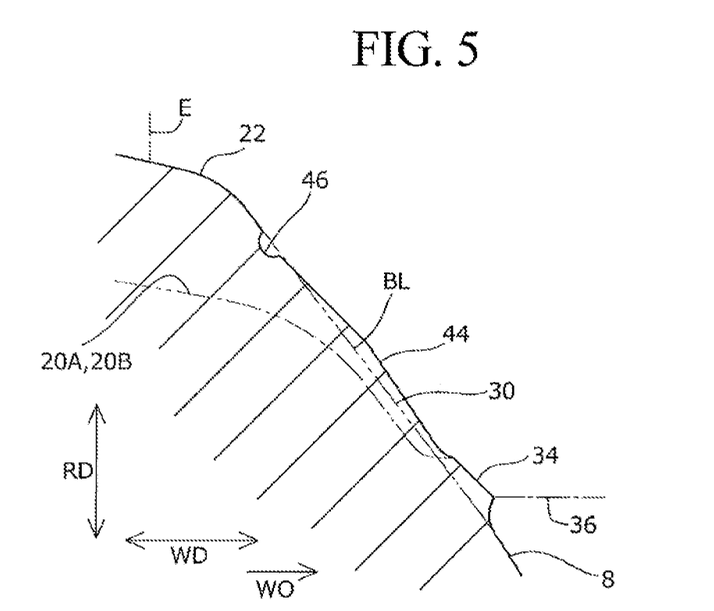
FIG. 5 is a cross-sectional view taken along a line V-V of FIG. 2.

Here, the buttress portion 32 is a region which is located on the outside WO in the tire width direction in relation to the tire ground contact end E and is located on the side of the tire ground contact end E in relation to the sidewall portion 8 and is inclined inward in the tire radial direction RD toward the outside WO in the tire width direction. In this example, a ridge 34 which extends in the tire circumferential direction CD is provided at the boundary between the sidewall portion 8 and the buttress portion 32. As illustrated in FIGS. 4 to 6, the ridge 34 is set as a split position (parting line) 36 between a die for molding the tread portion 10 and a die for molding the sidewall portion 8.

The extension portion 30 of the shoulder block 22 is provided with a raised portion 38. The raised portion 38 is formed to protrude with respect to the extension portion 30 as illustrated in FIG. 4 and hence also protrudes with respect to the front and rear lateral grooves 20A and 20B. A raised height H1 of the raised portion 38 with respect to the extension portion 30 is not particularly limited and may be, for example, about 1 to 5 mm at the maximum height position. Here, the raised height H1 is a height in the normal direction with respect to a reference contour line BL that defines the surface of the extension portion 30 in the tire meridian cross-section of the raised portion 38 as illustrated in FIG. 4.

In the embodiment, as illustrated in FIGS. 2 and 3, the raised portion 38 is provided in an extension portion 30A on the outside WO in the tire width direction of an edge portion (that is, a front edge portion) 40 on the front side RF in the rotation direction of the shoulder block 22. That is, the raised portion 38 is provided to be offset to a portion on the front side RF in the rotation direction in the extension portion 30 of the shoulder block 22.

The raised portion 38 extends in the tire width direction WD while being bent in a convex shape toward the rear side RR in the rotation direction in the extension portion 30A. Specifically, the raised portion 38 is formed in a V shape in the plan view while the center portion in the extension direction protrudes toward the rear side RR in the rotation direction and includes a first raised portion 38B which is inclined to the front side RF in the rotation direction at the tire ground contact end E side in relation to a bent portion 38A and a second raised portion 38C which is inclined to the front side RF in the rotation direction at the sidewall portion 8 side in relation to the bent portion 38A.

As illustrated in FIG. 4, in the raised portion 38, the raised height at the bent portion 38A is the highest, the raised height gradually decreases from the bent portion 38A toward a leading end portion 38B1 of the first raised portion 38B, and the raised height gradually decreases from the bent portion 38A toward the leading end portion of the second raised portion 38C. Then, in the raised portion 38, the leading end portion of the second raised portion 38C is connected to the ridge 34.

The raised portion 38 includes a corner portion 42 which protrudes from a front edge portion 40 of the shoulder block 22 toward the front side RF in the rotation direction. That is, the corner portion 42 is formed to protrude forward with respect to the extension line of the front edge portion 40. Specifically, the leading end portion (that is, the inner end portion in the tire width direction) 38B1 of the first raised portion 38B in the bent raised portion 38 protrudes from the front edge portion 40 of the shoulder block 22 toward the front side RF in the rotation direction so that a front end portion of the leading end portion 38B1 is formed as the corner portion 42. The corner portion 42 is formed in an acute angle shape in the plan view as illustrated in FIG. 2.

As illustrated in FIGS. 2, 3, and 5, an inclined surface portion 44 of which a raised height gradually decreases toward the rear side RR in the rotation direction is, provided at the rear side RR in the rotation direction of the raised portion 38 to be adjacent to the raised portion 38. The inclined surface portion 44 is provided in the entire rear edge 38D of the raised portion 38 and is formed in a bent shape similarly to the raised portion 38. In the inclined surface portion 44, a length in the tire circumferential direction CD is set to be larger than that of the raised portion 38. For that reason, the rear side of the raised portion 38 is supported by the inclined surface portion 44 having a wide gentle slope.

Furthermore, in this example, the extension portion 30 of the shoulder block 22 is provided with a shallow groove 46 formed at the boundary of the raised portion 38 and the inclined surface portion 44 with respect to the other portions thereof. That is, the raised portion 38 and the inclined surface portion 11 are provided on the outside WO in the tire width direction through the shallow groove 46 in the extension portion 30. The shallow groove 46 is a groove having a narrow groove width and a shallow groove depth clearly distinguished from the main groove 12 and the lateral groove 20. Although there is no particular limitation, the groove depth may be 1 mm or less.

Further, as illustrated in FIGS. 2 and 3, in the extension portion 30 of the shoulder block 22, a plurality of dimples 48 are provided to respectively correspond to the plurality of sipes 26 and each dimple 48 is provided to communicate with each corresponding sipe 26.

According to the pneumatic tire of the embodiment with the above-described configuration, the raised portion 38 is provided on the outside in relation to the tire ground contact end E of the shoulder block 22 and the raised portion 38 is provided with the corner portion 42 which protrudes from the front edge portion 40 of the shoulder block 22, that is, a stepping side edge portion toward the front side RF in the rotation direction. When the pneumatic tire runs on snowy or muddy roads where the rut is formed, the corner portion 42 bites into the side wall of the rut and hence the corner portion 42 contributes to an improvement in traction property during the forward rotation. That is, since the corner portion 42 scratches the side wall of the rut, it is possible to increase a forward running force inside the rut. For that reason, it is possible to improve running performance inside the rut. Further, since the corner portion 42 bits into the side wall of the rut also when escaping from the rut, it is possible to increase a force escaping from the rut and to improve rut escapeability.

Further, since the raised portion 38 is formed in a bent shape, a front edge 38E which is an edge portion of the raised portion 38 on the front side RF in the rotation direction increases in length and hence an edge effect can be improved. At the same time, since the raised portion 38 is formed in a bent shape, the rigidity of the raised portion 38 can be improved. For that reason, it is possible to improve the rut performance by increasing the traction performance during the forward rotation also from these points.

Further, since the corner portion 42 of the raised portion 38 is formed in an acute angle shape, the corner portion easily bits into the side wall of the nit and hence the rut performance can be improved.

Further, since the inclined surface portion 11 is provided on the rear side of the raised portion 38, that is, the kicking side, it is possible to ensure the rigidity by supporting the raised portion 38 from the rear side and to improve the traction performance during the forward rotation. Further, since the inclined surface portion 44 is less likely to become caught with respect to the side wall of the rut at the time of braking the tire, it is possible to prevent a handle from being taken off by the protrusion provided in the buttress portion 32 caught by the side wall of the rut.

Furthermore, in the above-described embodiment, all of the shoulder blocks 22 provided in the tread portion 10 are provided with the raised portion 38 and the corner portion 42, but a structure provided in all of shoulder blocks 22 is not limited. For example, the raised portion 38 and the corner portion 42 may be alternately provided among the plurality of shoulder blocks 22 provided side by side in the tire circumferential direction CD or the raised portion 38 and the corner portion 42 may be provided only in the shoulder block 22 on one side in the tire width direction WD.

Further, in the above-described embodiment, the shoulder blocks 22 completely divided by the front and rear lateral grooves 20A and 20B have been described as the land portion disposed in the shoulder region, but the land portion of the shoulder region corresponding to a target of the embodiment is not limited to the shoulder block completely divided in this way. For example, the shoulder land portion may be continuous in the tire circumferential direction in such a manner that the front and rear shoulder blocks are connected to each other by the narrow connection land portion provided on the inside in the width direction (that is, the side of the shoulder main groove). That is, the land portion of the shoulder region corresponding to a target of the embodiment may be divided into the front and rear land portions by the front and rear lateral grooves adjacent to each other in the tire circumferential direction at a position on the side of at least the tire ground contact end.

Furthermore, the dimensions in the specification are those in a normal state without any load in a state in which a pneumatic tire is mounted on a regular rim and is filled with a normal internal pressure. The regular rim is "Standard Rim" in the JATMA standard, "Design Rim" in the TRA standard, or "Measuring Rim" in the ETRTO standard. The normal internal pressure is "MAXIMUM AIR PRESSURE" in the JATMA standard, the "maximum value" described in "TIRE LOAD LIMITS AT VARIOUS COLD INFLATION PRESSURES" in the TRA standard, or "INFLATION PRESSURE" in the ETRTO standard.

The tire ground contact end indicates the outermost position of the ground contact surface in the tire width direction. The ground contact surface indicates a surface of the tread portion which contacts a road when the tire is assembled to a regular rim, is filled with a normal internal pressure, and is located vertically on a flat road when a normal load applied to the tire. The normal load is a load that each standard prescribes for each tire in the standard system including the standard on which the tire is based and is MAXIMUM LOAD CAPACITY in JATMA, MAXIMUM VALUE listed in the table for TRA, or "LOAD CAPACITY" in ETRTO. However, when the tire is for a passenger car, a load is set to 88% of the above-described load.

As the pneumatic tire according to the embodiment, tires for various vehicles such as a tire for a passenger car and a heavy duty tire for a truck, a bus, or a light truck (for example, a SUV car and a pickup truck) can be exemplified. Further, the application of the pneumatic tire is not particularly limited and the pneumatic tire may be used as all season tires and winter tires.

Although several embodiments have been described above, these embodiments have been suggested as an example and are not intended to limit the scope of the invention. These embodiments can be implemented in various other forms and can be implemented while being omitted, replaced, or changed in various ways without departing from the gist of the invention. These embodiments and modifications thereof are included in the scope and gist of the invention as well as in the scope of the invention described in the claims and their equivalents.

What is claimed is:

1. A pneumatic tire having a specified rotation direction, comprising:
   a land portion which is disposed between lateral grooves adjacent to each other in a tire circumferential direction in a shoulder region of a tread portion; and a raised portion which is provided in an extension portion of the land portion located at the outside in a tire width direction in relation to a tire ground contact end, wherein the raised portion includes a corner portion which protrudes from an edge portion of the land portion on a front side in the rotation direction toward the front side in the rotation direction, a shallow groove is provided at the extension portion, and the raised portion is provided at an outside of the shallow groove in the tire width direction, the raised portion extends in the tire width direction while being bent in a convex shape toward a rear side in the rotation direction in the outer extension portion in the tire width direction of the edge portion of the land portion on the front side in the rotation direction, and an inner end portion of the raised portion in the tire width direction protrudes from the edge portion of the land portion on the front side in the rotation direction toward the front side in the rotation direction so that the corner portion is formed, and the corner portion is provided at the inner end portion of the raised portion in the tire width direction, the inner end portion extending along the shallow groove.

2. The pneumatic tire according to claim 1,
wherein the corner portion of the raised portion has an acute angle in the plan view.

3. The pneumatic tire according to claim 2,
wherein an inclined surface portion of which a raised height decreases as it goes toward the rear side in the rotation direction is provided on the rear side in the rotation direction of the raised portion to be adjacent to the raised portion.

4. The pneumatic tire according to claim 1,
wherein an inclined surface portion of which a raised height decreases as it goes toward the rear side in the rotation direction is provided on the rear side in the rotation direction of the raised portion to be adjacent to the raised portion.

5. The pneumatic tire according to claim 1,
wherein the extension portion is a portion in which the land portion protruding with respect to a front lateral groove and a rear lateral groove extends in a buttress portion from the tire ground contact end to a sidewall portion; and a ridge which extends in the tire circumferential direction is provided at the boundary between the sidewall portion and the buttress portion.

6. The pneumatic tire according to claim 1,
wherein the raised portion is bent in a V shape in the plan view while a center portion thereof in an extension direction protrudes toward the rear side in the rotation direction and includes a first raised portion which is inclined to the front side in the rotation direction at the tire ground contact end side in relation to a bent portion and a second raised portion which is inclined to the front side in the rotation direction at a sidewall portion side in relation to the bent portion.

7. The pneumatic tire according to claim 6,
wherein the raised portion includes a raised height, that is the highest, at the bent portion, the raised height gradually decreases from the bent portion toward a leading end portion of the first raised portion, and the raised height gradually decreases from the bent portion toward a leading end portion of the second raised portion.

8. The pneumatic tire according to claim 1,
wherein a display for designating the rotation direction of the tire that is a direction to which the tire rotates when a vehicle runs forward is provided on a sidewall portion of the pneumatic tire.

\* \* \* \* \*